(12) United States Patent
Osterlaenger et al.

(10) Patent No.: US 8,205,519 B2
(45) Date of Patent: Jun. 26, 2012

(54) BALL SCREW

(75) Inventors: Juergen Osterlaenger, Emskirchen (DE); Dieter Adler, Herzogenaurach (DE); Ralf Mayer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 563 days.

(21) Appl. No.: 12/513,303

(22) PCT Filed: Oct. 31, 2007

(86) PCT No.: PCT/EP2007/061736
§ 371 (c)(1),
(2), (4) Date: May 1, 2009

(87) PCT Pub. No.: WO2008/053010
PCT Pub. Date: May 8, 2008

(65) Prior Publication Data
US 2010/0064837 A1    Mar. 18, 2010

(30) Foreign Application Priority Data
Nov. 2, 2006 (DE) .................. 10 2006 051 639

(51) Int. Cl.
*F16H 1/24* (2006.01)
*A44B 11/25* (2006.01)

(52) U.S. Cl. ............ 74/424.87; 74/424.79; 74/424.82; 74/424.86; 24/393

(58) Field of Classification Search ............ 74/424.78, 74/424.79, 424.81, 424.82, 424.86, 424.87; 384/43, 46, 49, 50, 52; 24/293, 294, 295, 24/457, 545; 403/326, 327, 338
See application file for complete search history.

(56) References Cited

U.S. PATENT DOCUMENTS

| | | | | |
|---|---|---|---|---|
| 3,231,298 A * | 1/1966 | Tomb et al. | ............ | 285/233 |
| 3,661,030 A | 5/1972 | Gagne | | |
| 4,364,282 A * | 12/1982 | Nilsson | ............ | 74/424.82 |
| 5,373,755 A * | 12/1994 | Rohlinger | ............ | 74/424.86 |
| 6,851,722 B2 * | 2/2005 | Chiu et al. | ............ | 285/134.1 |
| 2009/0151493 A1 * | 6/2009 | Miyahara | ............ | 74/424.87 |

FOREIGN PATENT DOCUMENTS

| | | |
|---|---|---|
| DE | 91 05 795 A | 7/1991 |
| DE | 195 26 727 A | 1/1996 |
| WO | 2004/055416 A | 7/2004 |

* cited by examiner

*Primary Examiner* — Justin Krause
*Assistant Examiner* — Adam D Rogers
(74) *Attorney, Agent, or Firm* — Lucas & Mercanti, LLP; Klaus P. Stoffel

(57) ABSTRACT

A ball screw drive which has a ball nut arranged on a spindle. The ball nut has a nut element and a deflecting element that deflects balls out of one end of an endless ball channel defined by the ball nut and the spindle to a beginning of the ball channel. The deflecting element is retained on the nut element through a clip. At least one clip leg of the clip has a first, resiliently biased section and a second section separated from the first section by a slit. The first section resiliently suspends the deflecting element on the nut element and the second section retains the clip inseparably on the deflecting element.

15 Claims, 2 Drawing Sheets

BALL SCREW

This application is a 371 of PCT/EP2007/061736 filed Oct. 31, 2007, which in turn claims the priority of DE 10 2006 051 369.7 filed Nov. 2, 2006, the priority of both applications is hereby claimed and both applications are incorporated by reference herein.

FIELD OF THE INVENTION

The present invention concerns a ball screw drive comprising a ball nut arranged on a spindle. Ball screw drives convert a movement of rotation into a translational movement. They are used in machine construction und increasingly also in vehicle construction in the field of chassis.

BACKGROUND OF THE INVENTION

The document DE 195 26 727 B4 discloses a ball screw drive comprising a ball nut arranged on a spindle. The ball nut comprises a nut element and a deflecting element that deflects balls from one end of an endless ball channel defined by the ball nut and the spindle to a beginning of the ball channel, said deflecting element being retained on the nut element through a clip. The clip bent into a circular arc shape engages a groove that is configured on the ball nut. When the clip loses its elasticity, a satisfactory retention of the deflecting element is no longer guaranteed and, moreover, the clip can fall off the ball nut.

OBJECTS OF THE INVENTION

It is an object of the invention to provide a ball screw drive that guarantees a perfect retention of the deflecting element on the nut element.

This and other objects and advantages of the invention will become obvious from the following detailed description.

SUMMARY OF THE INVENTION

The invention achieves the above objects by the fact that at least one clip leg of the clip comprises a first, resiliently biased section and a second section separated from the first section by a slit, said first section resiliently suspending the deflecting element on the nut element and said second section retaining the clip inseparably on the deflecting element. The clip of the invention offers the advantage of a separation of functions, namely a separation into a clamping region and a snapping region. The clamping region assures that the deflecting element is retained perfectly on the nut element. The snapping region assures that the clip is secured against loss. These two regions are separated from each other by the slits. This separation of functions is advantageous both from the point of view of stresses and from the functional point of view. Manufacturing tolerances of the deflecting elements and the clip have no detrimental effect on the two main functions. Without this separation of functions, either the clamping in peripheral direction or the securing against loss would not be adequately guaranteed, because, for instance, the permissible stresses would be exceeded and/or the springs plasticized.

The second section of the clip leg may comprise a hook-shaped contour and engage through this hook-shaped contour around an engaging element configured on the deflecting element. In this way, a perfect, inseparable connection between the clip and the deflecting element can be guaranteed.

A gap can be formed between peripherally opposing ends of two deflecting elements arranged behind each other on the periphery of the nut element. This gap assures that, through the clip, both the deflecting elements can be satisfactorily pressed or resiliently suspended onto the nut element without prior abutment of the ends of the deflecting elements against each other.

Preferably, two deflecting elements arranged behind each other in peripheral direction can both comprise engaging elements, and clips preferably arranged opposite each other on the periphery of the ball nut can surround the engaging elements of one of the deflecting elements through one of their clip legs and the engaging elements of the other deflecting element through their other clip legs. For instance, two deflecting elements can be perfectly retained on the nut element through two clips while, at the same time, an inseparable retention of the clips on the deflecting elements is also guaranteed.

Preferably, the first sections of the clip legs of both clips are resiliently biased and surround the engaging elements of the deflecting elements, so that both the deflecting elements are resiliently suspended on the nut element.

Through hook-shaped contours the second sections of the clip legs of both clips can snap into catches or engaging elements configured on the deflecting elements.

The first or even the second sections of the clip legs may comprise insertion slants to enable pushing onto the engaging elements of the deflecting elements. In this way, the clips can be mounted by radial pushing onto the engaging elements, so that the second sections engage or snap into the catches through their hook-shaped contours.

The clip is preferably arranged within an enveloping circle defined by the outer periphery of the deflecting elements. In this way, an enlargement of the radial design space can be avoided. For instance, the clip can have a U-shaped configuration.

The clip is preferably made of a springy material, spring sheet metal being preferably suitable.

In an alternative embodiment of the invention, two deflecting elements are arranged behind each other on the periphery of the nut element and comprise on their opposing ends respective engaging elements. Clips arranged spaced apart on the periphery of the ball nut engage through first clip legs the engaging elements of one of the deflecting elements, and through second clip legs the engaging elements of the other deflecting element. In this ball screw drive of the invention it is likewise assured that, for instance, two clips retain the two deflecting elements perfectly on the nut element.

Similar to the first example of embodiment of the invention, the clip legs can comprise a first, resiliently biased section and a second section that is separated by a slit from the first section, the first sections resiliently suspending the deflecting elements on the nut element and the second sections retaining the clips inseparably on the deflecting elements.

The clip legs of the clips can comprise a first resiliently biased section and a second section that is separated by a slit from the first section, the first sections resiliently suspending the deflecting elements on the nut element and the second sections retaining the clips inseparably on the deflecting elements.

BRIEF DESCRIPTION OF THE DRAWING

The invention will be described more closely in the following with reference to an example of embodiment and to the appended total of four figures.

DETAILED DESCRIPTION OF THE DRAWING

Figure 1:
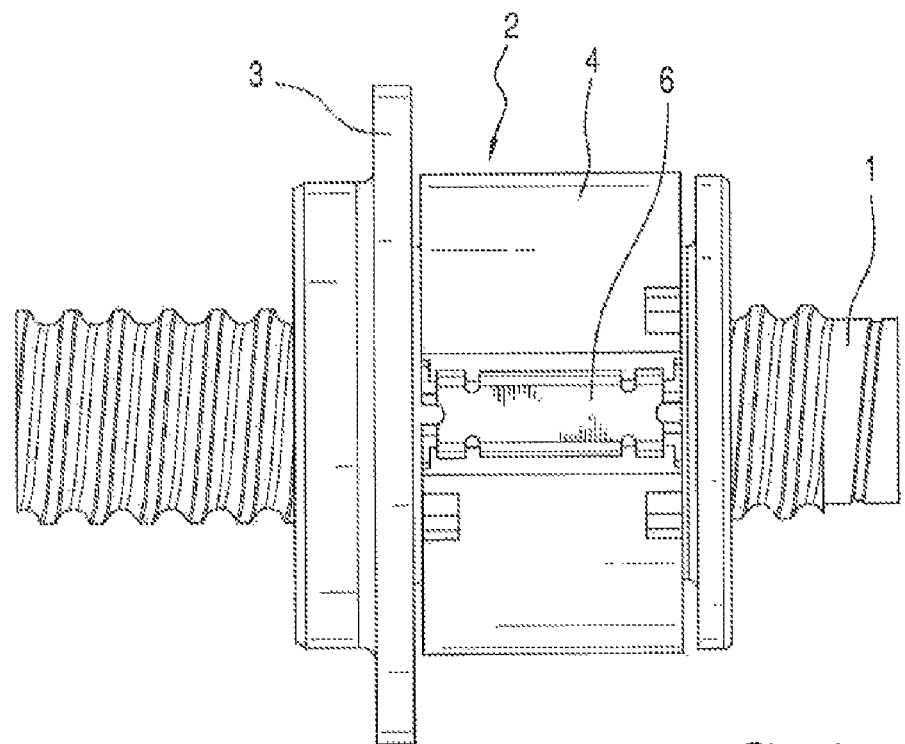
FIG. 1 is a view of a ball screw drive of the invention.

The ball screw drive of the invention illustrated in FIG. 1 comprises a ball nut 2 arranged on a spindle 1. The ball nut 2 comprises a nut element 3 and two deflecting elements 4 arranged behind each other on the periphery of the ball nut 2. As known, the ball nut 2 and the spindle 1 define endless ball channels 5 in which balls, not shown, roll endlessly. As also known, the deflecting elements 4 have the function of deflecting the balls out of one end of the ball channel to a beginning of this ball channel. The present example of the ball screw drive of the invention comprises two endless ball channels 5 and a respective deflecting element 4 associated to each endless ball channel 5.

Figure 2:
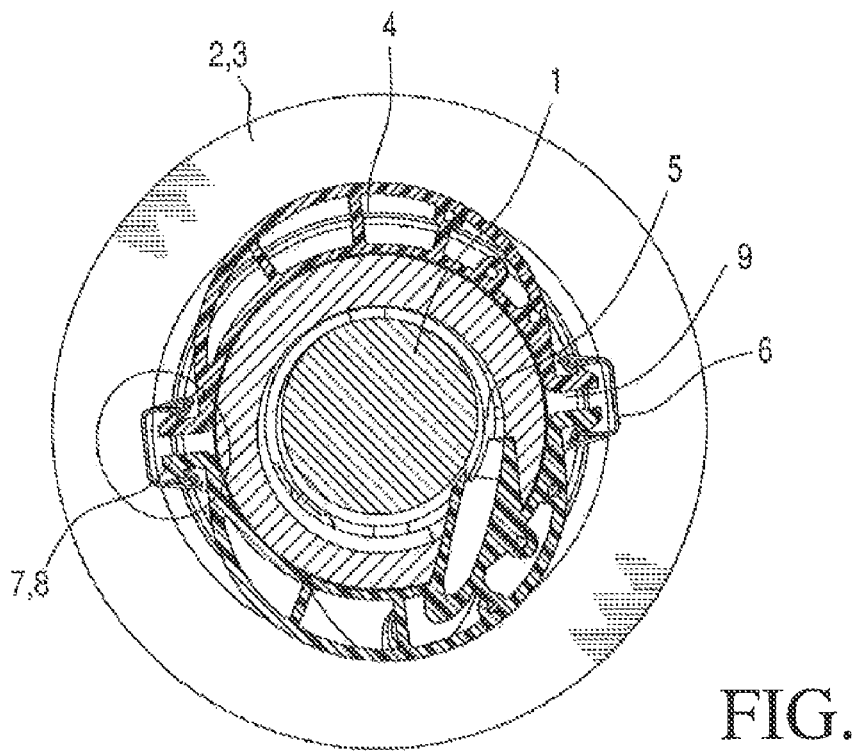
FIG. 2 shows a cross-section through a ball screw drive of FIG. 1.

FIG. 2 shows a cross-sectional view of an entrance and an exit configured on the deflecting element 4 for the balls.

To assure a smooth transition of the ball channel 5 from the nut element 3 to the deflecting element 4, the deflecting elements 4 are perfectly positioned and retained on the nut element 3. For this purpose, two clips 6 are provided and clipped onto the two deflecting elements 4 and suspend these deflecting elements 4 resiliently against the nut element 3.

It can be seen from FIG. 2 that the two approximately arc-shaped deflecting elements 4 arranged behind each other on the periphery possess opposing ends that are configured as radially outwards directed hooks 7. These hooks 7, at the same time, constitute engaging elements 8 around which the clips 6 can engage. It can be seen further in FIG. 2 that a gap 9 is formed respectively between every two opposing ends of the two deflecting elements 4. The gaps 9 guarantee a perfect resilient suspension of the deflecting elements 4 against the nut element 3 without the two deflecting elements 4 coming into contact with each other before they are perfectly positioned and resiliently suspended on the nut element 3. The clips 6 are situated within an enveloping circle that envelopes the deflecting elements 4.

Figure 3:
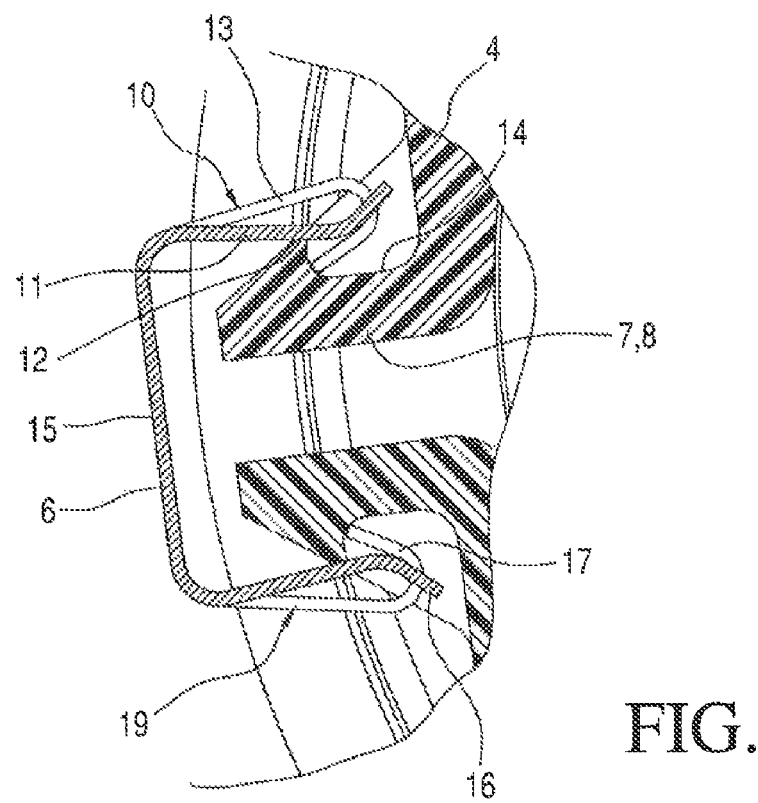
FIG. 3 shows a detail out of FIG. 2, in an enlarged representation.

FIG. 3 is an enlarged representation of a detail out of FIG. 2 showing in particular the hooks 7 of the two deflecting elements 4 and the clip 6. It can be seen from this illustration that the clip 6 comprises two clip legs, a first clip leg 10 and a second clip leg 19. One of the clip legs 10 engages the engaging element 8 of one of the deflecting elements 4 and the other clip leg 19 engages the engaging element 8 of the other deflecting element 4. Each clip leg 10, 19 comprises two sections. The first section 11 is resiliently biased and abuts against a hook tip 12 of the hook 7. The second section 13 has a hook-shaped contour and engages or snaps into an engaging element 14 of the hook 7. The two clip legs 10, 19 are integrally connected to each other through a clip back 15. The engagement of the hook-shaped second section 13 into the engaging element 14 guarantees that the clips 6 are inseparably connected to the deflecting elements 4. The resiliently biased first sections 11 of the clip legs 10, 19 are in resilient contact with the hook tips 12 of the engaging elements 8 or hooks 7, so that the deflecting elements 4 are pressed or perfectly suspended resiliently against the nut element 3.

FIG. 3 further shows that both sections 11, 13 of the clip legs 10, 19 comprise insertion slants 16, 17 on their free ends, so that a perfect radial pushing of the clips 6 onto the engaging elements 8 is guaranteed. During this radial pushing, the insertion slants 16, 17 come to bear against the ramp-shaped hook 7 and, when pushed further radially, these insertion slants 16, 17 slide along the hook 7 thus leading to a simultaneous spreading of the clip legs 10. Finally, the insertion slants 16, 17 penetrate into the region of the engaging element 14. In this situation, a part of the spread of the clip legs 10, 19 is neutralized due to elastic relaxation. However, in this state of installation, the first sections 11 of the clip legs 10, 19 are still resiliently biased.

Figure 4:
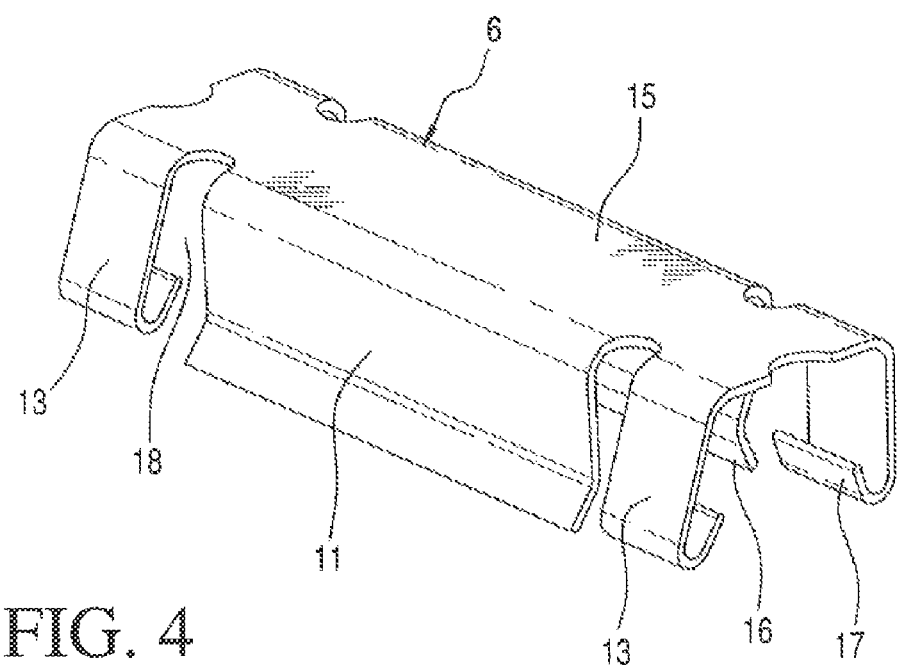
FIG. 4 shows an individual part of the ball screw drive of FIG. 1.

FIG. 4 is a perspective representation of the clip 6. In the present example of embodiment of the invention, the clip 6 is made of thin spring sheet metal. Clearly visible are slits 18 between the first sections 11 and the second sections 13 of the clip legs 10, 19. These slits 18 assure a separation of the functions of the two sections 11 and 13. This means that in the installed position, the first sections 11 can still be resiliently biased, the second sections 13, however, may, but must not be relaxed.

The proposed clip 6 thus enables two functions that are independent from each other: on the one hand, the first sections 11 guarantee a perfect retention or resilient suspension of the deflecting elements 4 on the nut element 3 and on the other hand, the second sections 13 guarantee an inseparable retention of the clips 6 on the two deflecting elements 4 without these first and second sections impeding or influencing each other in their respective functions. In the present example of embodiment, the clip is bent into an approximate U-shape out of sheet metal, and the free ends of both sections 11 and 13 of the clip legs 10, 19 are slanted, for example, by angular bending for forming the insertion slants 16, 17.

LIST OF REFERENCE NUMERALS

1 Spindle
2 Ball nut
3 Nut element
4 Deflecting element
5 Ball Channel
6 Clip
7 Hook
8 Engaging element
9 Gap
10 First clip leg
11 First section
12 Hook tip
13 Second section
14 Engaging element
15 Clip back
16 Insertion slant
17 Insertion slant
18 Slit
19 Second clip leg

The invention claimed is:

1. A ball screw drive, comprising:
a ball nut arranged on a spindle, said ball nut comprising a nut element and at least one deflecting element for deflecting balls out of one end of an endless ball channel defined by the ball nut and the spindle to a beginning of the ball channel; and
at least one clip having at least one clip leg, the at least one clip leg comprises a first, resiliently biased section and a second section that is separated from the first section by a slit, said first section resiliently suspends the deflecting element on the nut element and the second section retains the at least one clip inseparably on the deflecting element.

2. The ball screw drive according to claim 1, wherein the at least one deflecting element has an engaging element, and the second section of the at least one clip leg comprises a hook-shaped contour and surrounds, through the hook-shaped contour, the engaging element configured on the at least one deflecting element.

3. The ball screw drive according to claim 2, wherein the ball nut comprises two deflecting elements which are arranged behind each other in a peripheral direction on a periphery of the nut element and a gap is formed between peripherally opposing ends of the two deflecting elements.

4. The ball screw drive according to claim 3, wherein the ball screw drive comprises two clips and each of the two deflecting elements have engaging elements and the clips, which each have a first clip leg and a second clip leg, are arranged opposite each other on a periphery of the ball nut, surrounding the engaging elements of one of the two deflecting elements via the first clip leg and surrounding the engaging elements of the other of the two deflecting elements via the second clip leg.

5. The ball screw drive according to claim 4, wherein the first clip leg and the second clip leg of the clips each have first sections, which are resiliently biased and surround the engaging elements of the two deflecting elements, so that the two deflecting elements are resiliently suspended on the nut element.

6. The ball screw drive according to claim 4, wherein the first clip leg and the second clip leg of the clips each have second sections which have hook-shaped contours that snap into engaging elements configured on the two deflecting elements.

7. The ball screw drive according to claim 1, wherein the at least one deflecting element has engaging elements and the first and the second sections of the clip leg comprise insertion slants for enabling a pushing of the at least one clip onto the engaging elements of the deflecting element.

8. The ball screw drive according to claim 1, wherein the at least one clip is arranged within an enveloping circle defined by an outer periphery of the at least one deflecting element.

9. The ball screw drive according to claim 1, wherein the at least one clip is made of a resiliently elastic material.

10. A ball screw drive, comprising:
a ball nut arranged on a spindle, said ball nut comprising a nut element and two deflecting elements for deflecting balls out of one end of an endless ball channel defined by the ball nut and the spindle to a beginning of the ball channel, the two deflecting elements are arranged behind each other on a periphery of the nut element and comprise on opposing ends engaging elements; and
clips, which retain the deflecting elements on the nut element, having first clip legs and second clip legs spaced apart from one another and arranged on a periphery of the ball nut, the clips engage, via the first clip legs, the engaging elements of one of the two deflecting elements and the clips engage, via the second clip legs, the engaging elements of the other of the two deflecting elements.

11. A The ball screw drive according to claim 10, wherein the clip legs comprise a first, resiliently biased section and a second section separated from the first section by a slit, said first sections resiliently suspend the deflecting elements on the nut element and the second sections retain the clips inseparably on the deflecting elements.

12. The ball screw drive according to claim 11, wherein the first and the second section of the clip legs comprise insertion slants for enabling a pushing of the clips onto the engaging elements of the deflecting elements.

13. The ball screw drive according to claim 10, wherein the clips comprise, on the clip legs, a first, resiliently biased section and a second section separated from the first section by a slit, said first section resiliently suspends the deflecting elements on the nut element and said second section retains the clips inseparably on the deflecting elements.

14. A ball screw drive according to claim 10, wherein the clips are arranged within an enveloping circle defined by an outer periphery of the deflecting elements.

15. A ball screw drive according to claim 10, wherein the clip is made of a resiliently elastic material.

\* \* \* \* \*